United States Patent [19]
Fukano et al.

[11] Patent Number: 5,950,923
[45] Date of Patent: Sep. 14, 1999

[54] SUCK BACK VALVE

[75] Inventors: Yoshihiro Fukano; Tetsuro Maruyama, both of Ibaraki-ken, Japan

[73] Assignee: SMC Kabushiki Kaisha, Tokyo, Japan

[21] Appl. No.: 09/044,225

[22] Filed: Mar. 19, 1998

[30] Foreign Application Priority Data

Mar. 25, 1997 [JP] Japan ..................................... 9-72435

[51] Int. Cl.[6] ................................................. B05B 15/06
[52] U.S. Cl. ............................ 239/119; 239/106; 239/75; 222/571; 251/11; 251/30.02; 251/63.5; 251/331
[58] Field of Search .............................. 239/75, 104, 106, 239/119, 583, 586; 222/571; 251/11, 30.02, 63.5, 331

[56] References Cited

U.S. PATENT DOCUMENTS

| | | | |
|---|---|---|---|
| 3,895,748 | 7/1975 | Klingenberg | 222/571 |
| 4,394,945 | 7/1983 | Taylor, Jr. | 222/571 |
| 4,597,719 | 7/1986 | Tano | 222/571 X |
| 4,943,032 | 7/1990 | Zdeblick | 251/11 |
| 5,134,962 | 8/1992 | Amada et al. | 222/571 X |
| 5,423,482 | 6/1995 | Mueller et al. | 239/119 X |

FOREIGN PATENT DOCUMENTS

| | | |
|---|---|---|
| 60-05506 | 1/1994 | Japan . |
| 8-10399 | 3/1996 | Japan . |

*Primary Examiner*—Andres Kashnikow
*Assistant Examiner*—Steven J. Gavey
*Attorney, Agent, or Firm*—Oblon, Spivak, McClelland, Maier & Neustadt, P.C.

[57] ABSTRACT

A suck back valve is proposed, comprising a suck back mechanism for sucking a coating liquid inside a fluid passage under a negative pressure action of a diaphragm displaced by a pilot pressure, an ON/OFF valve for opening and closing the fluid passage under action of the pilot pressure, and a flow amount control device for controlling the pilot pressure supplied to the ON/OFF valve.

9 Claims, 7 Drawing Sheets

FIG. 7

SUCK BACK VALVE

BACKGROUND OF THE INVENTION

1. Field of the Invention

The present invention relates to a suck back valve in which liquid dripping, for example occurring at a supply port of a fluid passage, is prevented by sucking a predetermined amount of fluid flowing through the fluid passage by displacement of a diaphragm, yet wherein the sucked amount of fluid can be stabilized.

2. Description of the Related Art

There has hitherto been known, for example, a semiconductor wafer manufacturing process in which a suck back valve is employed. In the suck back valve, when supply of coating liquid to the semiconductor wafer is halted, there is a function for preventing so called liquid drip, wherein minute amounts of coating liquid drip from a supply port onto the semiconductor wafer.

Figure 7:
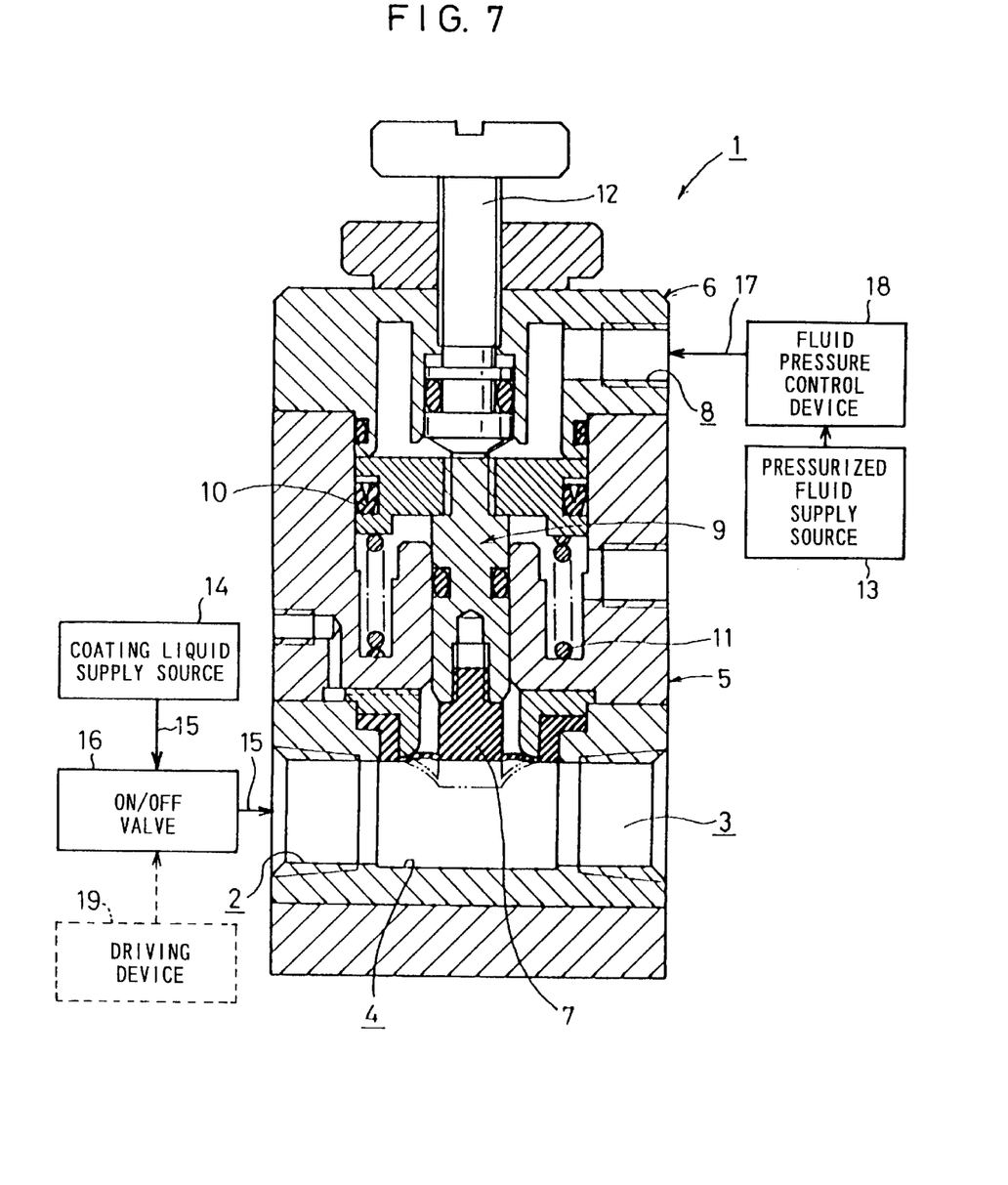
FIG. 7 is a vertical cross-sectional view of a suck back valve in accordance with the conventional technique.

The suck back valve according to such a conventional technique is shown in FIG. 7 and is disclosed, for example, by Japanese Utility Model Publication No. 8-10399.

Such a suck back valve 1 comprises a main valve body 5 formed with a fluid passage 4 interconnecting a fluid inlet port 2 and a fluid outlet port 3, and includes a bonnet 6 connected to an upper portion of the main valve body 5. A diaphragm 7 made up of a thick-walled portion and a thin-walled portion is disposed in the center of the fluid passage 4. A pressurized fluid supply source 13 is connected to the bonnet 6, and a pressurized fluid supply port 8, for supplying pressurized air for operating the diaphragm under a switch-over action of a directional control valve, is formed in the bonnet 6.

A piston 9 is fitted to the diaphragm 7, with a v-packing 10 installed in the piston 9 and slidable along an inner wall surface of the main valve body 5 and serving a sealing function. Further, a spring 11 which normally presses the piston in a upward direction, is disposed in the main valve body 5.

An adjusting screw 12 is disposed on the top of the bonnet 6 which, by increasing or decreasing a screw-in amount thereof, abuts against the piston 9 and adjusts a displacement amount of the piston 9, whereby the amount of coating liquid sucked by the diaphragm 7 is adjusted.

A coating liquid supply source 14, storing therein a coating liquid, is connected to the pressurized fluid inlet port 2 through a conduit 15 such as a tube, and further, between the coating liquid supply source 14 and the fluid inlet port 2, an ON/OFF valve 16, which is constructed separately from the suck back valve, is connected. The ON/OFF valve 16 performs a function of switching between a supply state, and a supply-halted state, of the coating liquid to the suck back valve 1, by energization and de-energization of the ON/OFF valve 16.

Operation of the suck back valve 1 shall now be explained in outline. In an ordinary state in which the fluid is supplied from the fluid-inlet port 2 to the fluid-outlet port 3, the piston 9 and diaphragm 7 are displaced downwardly in an integrated manner in accordance with action of the pressurized fluid supplied from the pressurized fluid supply port 8. The diaphragm 7, which is coupled to the piston 9, protrudes into the fluid passage 4 as shown in FIG. 7 by the two-dot-chain line.

At that point, in the case that the flow of coating liquid inside the fluid passage 4 is halted by a switch-over action of the ON/OFF valve 16, by halting the supply of pressurized air from the pressurized fluid supply port 8, the piston 9 and diaphragm 7 are raised in unison under action of the elastic force of the spring 11, wherein coating liquid remaining in the fluid passage 4 is sucked by a negative pressure action of the diaphragm 7, and liquid dripping at an unillustrated supply port is prevented.

Incidentally, in the suck back valve 1 according to the conventional technique, in order to adjust with high accuracy the flow amount of pressurized air supplied from the pressurized fluid supply source 13, a fluid pressure control device 18 is interveningly installed between the pressurized fluid supply source 13 and the pressurized fluid supply port 8 through a conduit 17 such as a tube. The fluid pressure control device 18 is formed separately and apart from the suck back valve 1, wherein an unillustrated control element comprising for example an electrostrictive element for converting an electric signal to air pressure, is arranged in the fluid pressure control device 18.

Notwithstanding, in the suck back valve 1 according to the conventional technique, because reproducibility of the displacement with respect to voltage applied by the electrostrictive element, which possesses hysteresis, is rather poor, it becomes troublesome to control with high accuracy the flow amount of pressurized air which is supplied to the pressurized fluid supply port 8. Further, such an electrostrictive element experiences large clipping, along with the disadvantage of inferior durability.

Further, in the case of the suck back valve 1 according to the conventional technique, pipe connecting operations between the suck back valve 1 and the fluid pressure control device 18, as well as between the suck back valve 1 and the ON/OFF valve 16, become necessary, adding complexity to the system, and further, because the fluid pressure control device 18 and the ON/OFF valve 16 respectively are installed externally of the suck back valve 1, dedicated space therefor is needed, with the disadvantage that installation space increases.

Furthermore, fluid passage resistance is increased by the piping which is connected between the suck back valve 1 and the fluid pressure control device 18, with the disadvantage that response accuracy (responsiveness) of the diaphragm 7 is deteriorated.

Still further, a driving device 19 is specially required for switching the ON/OFF valve 16 between ON and OFF states, wherein along with the added complexity of pipe connecting operations between the ON/OFF valve 16 and the driving device 19, there is the drawback of soaring production costs.

SUMMARY OF THE INVENTION

A general object of the present invention is to provide a suck back valve capable of controlling with high accuracy a pilot pressure supplied to an ON/OFF valve and a suck back mechanism.

A main object of the present invention is to provide a suck back valve in which pipe connecting operations are unneeded and which enables minimization of installation space.

Another object of the present invention is to provide a suck back valve capable of improving response accuracy of a flexible member which is disposed to face a fluid passage.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

Figure 1:
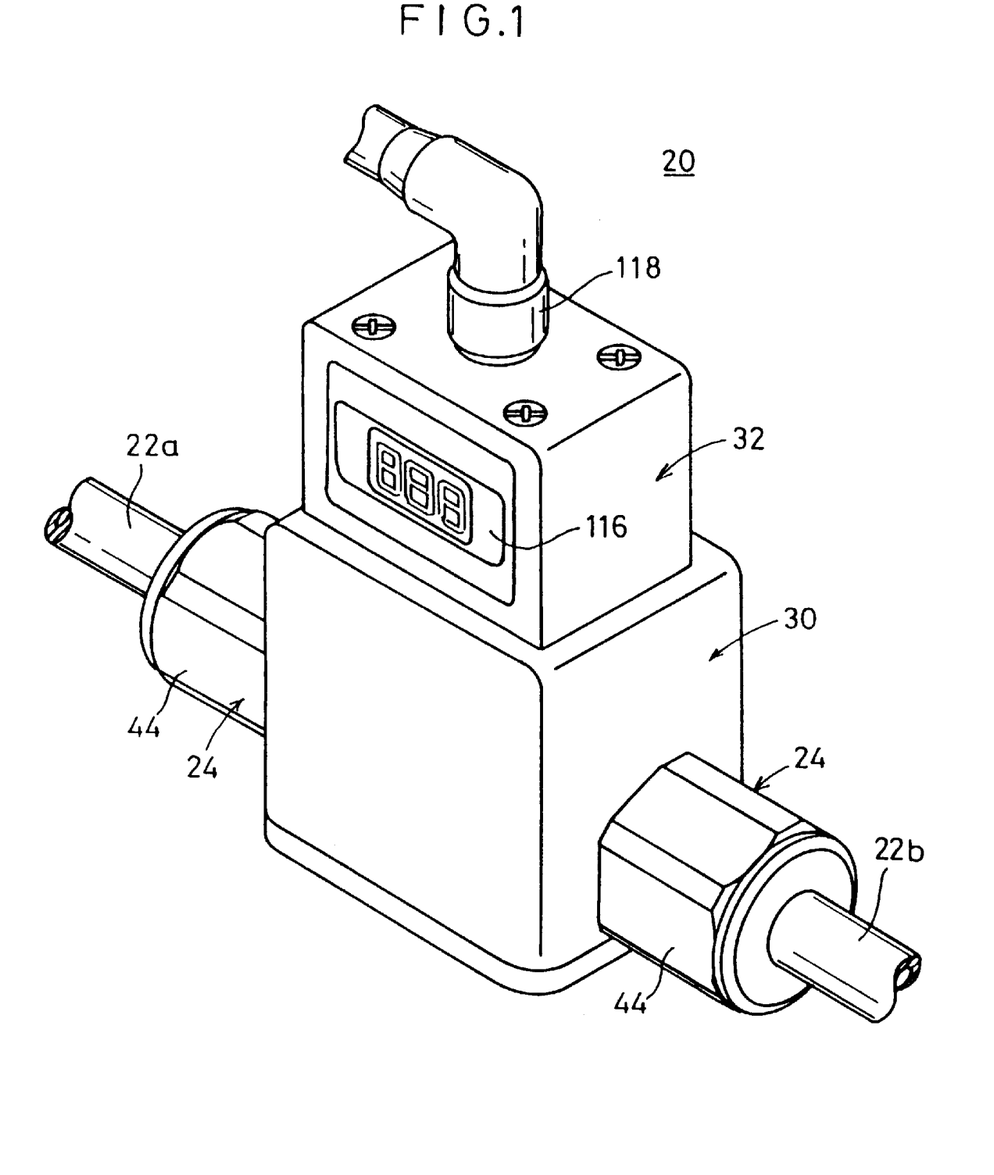
FIG. 1 is a perspective view of a suck back valve in accordance with an embodiment of the present invention.

Referring to FIG. 1, reference numeral 20 indicates a suck back valve according to an embodiment of the present invention. The suck back valve 20 is constructed from a coupling 24 to which a pair of tubes 22a, 22b are detachably connected at a fixed interval separation, a valve driving device 30 disposed on an upper part of the coupling 24 and having disposed internally an ON/OFF valve 26 and a suck back mechanism 28 (see FIG. 2), and a controller 32 for controlling switching of a pressurized fluid supplied respectively to the ON/OFF valve 26 and to the suck back mechanism 28, along with controlling the pressure (pilot pressure) of a pressurized fluid supplied to the ON/OFF valve 26 and to the suck back mechanism 28. Further, as shown by FIG. 1, the coupling 24, the valve driving device 30 and the controller 32 are assembled together integrally.

Figure 2:
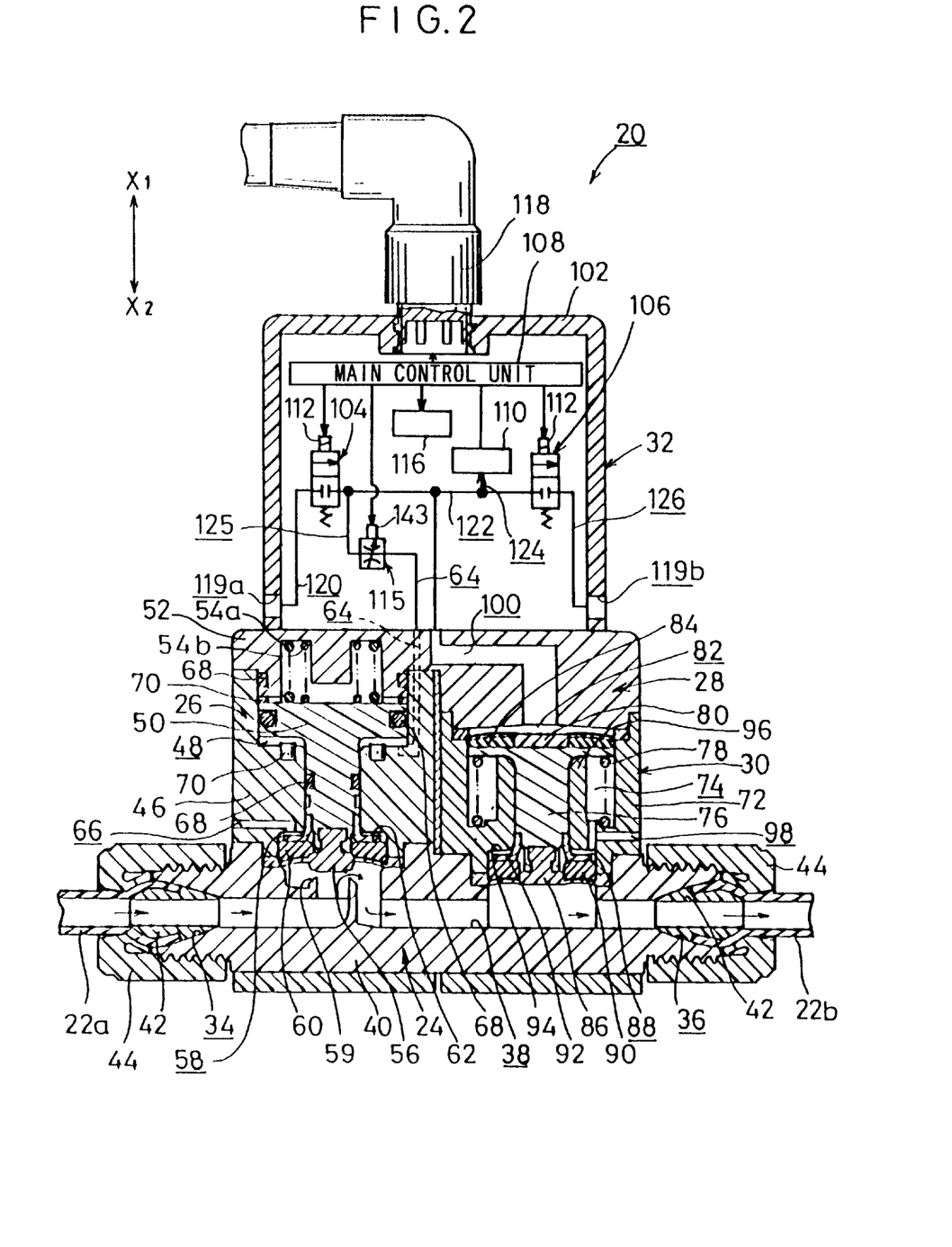
FIG. 2 is a vertical cross-sectional view of the suck back valve shown in FIG. 1.

As shown in FIG. 2, the coupling 24 includes a coupling body 40 having a first port 34 formed in one end, and a second port 36 formed in the other end thereof, and having disposed therein a fluid passage 38 intercommunicating the first port 34 and the second port 36, inner members 42 coupled respectively to the first port 34 and the second port 36 and being inserted into the openings of tubes 22a, 22b, and lock nuts 44 for maintaining fluid-tight the positions of the tubes 22a, 22b by threadedly inserting the lock nuts onto screw threads cut into ends of the coupling body 40.

An ON/OFF valve 26 is arranged on an upper part of the coupling 24 in proximity to the first port 34, the ON/OFF valve 26 having a first valve body 46 integrally connected with the coupling body 40, a piston 50 displaceable in directions of arrows $X_1$ and $X_2$ along a cylinder chamber formed inside the first valve body 46, and a cover member 52 for hermetically blocking the cylinder chamber 48. The cover member 52 extends to and over the suck back mechanism 28.

A pair of different diameter spring elements 54a, 54b are interveningly disposed between the piston 50 and the cover member 52, wherein the piston 50 is normally biased downward (in the direction of arrow $X_2$) under an elastic force of the spring elements 54a, 54b.

A first diaphragm chamber 58 which is blocked by a first diaphragm 56 is formed at a lower end of the piston 50, wherein the first diaphragm 56 is connected to the lower end of the piston 50 and disposed for displacement integrally with the piston 50. In this case, the first diaphragm 56 performs a function for opening and closing the fluid passage 38 by separation thereof from a seat 59 formed in the coupling body 40, and further by seating thereof onto the seat 59. Accordingly, under an opening/closing action of the ON/OFF valve 26, a pressurized fluid which flows through the fluid passage 38 (for example, a coating liquid) is switched between a supply state and a supply-halted state.

Further, a ring-shaped cushioning member 60 for protecting a thin-walled portion of the first diaphragm 56 is disposed on an upper surface part of the first diaphragm 56, the cushioning member 60 being supported by a cross-sectionally L-shaped support member 62 connected to a lower end of the piston 50.

A first pilot passage 64 intercommunicating the aforementioned flow amount control device and the ON/OFF valve 26 is formed in the first valve body 46. In this case, under a control action of the flow amount control device, by supplying a pressurized fluid (pilot pressure) to the interior of the cylinder chamber 48 through the first pilot passage 64, the piston 50 is raised in opposition to the elastic force of spring elements 54a, 54b. Accordingly, the first diaphragm 56 separates a predetermined interval separation from the seat 59, opening the fluid passage 38, whereby coating liquid flows from the first port 34 toward the side of the second port 36.

Further, a passage 66 for communicating the first diaphragm chamber 58 with atmosphere is formed in the first valve body 46, wherein by discharging air inside the first diaphragm chamber 58 through the passage 66, the diaphragm 56 can be smoothly operated. Moreover, reference numeral 68 indicates respective seals for maintaining airtightness of the cylinder chamber 48, and reference numeral 70 indicates a cushioning member abutting the piston 50 and serving a cushioning function.

A suck back mechanism 28 is disposed on an upper part of the coupling body 24 in proximity to the second port 36. The suck back mechanism 28 comprises a second valve body 72 connected integrally with the coupling body 40 and the first valve body 46, and a stem 76 displaceable in directions of arrows $X_1$ and $X_2$ along a chamber 74 formed in the second valve body 72. Inside the chamber 74, a spring element 78 is arranged, which normally biases the stem 76 upwardly (in the direction of arrow $X_1$) by an elastic force generated through contact with a flange of the stem 76.

A second diaphragm 80 extends from an upper part of the stem 76, and is coupled to an upper surface of the stem 76, wherein by supplying a pilot pressure upwardly of the second diaphragm 80, a second diaphragm chamber (pilot chamber) 82 is formed which acts on the second diaphragm 80. In this case, a cushioning member 84 which is formed, for example, from a rubber material or the like is interveningly disposed between a thin-walled portion of the second diaphragm 80 and the stem 76.

Figure 4:
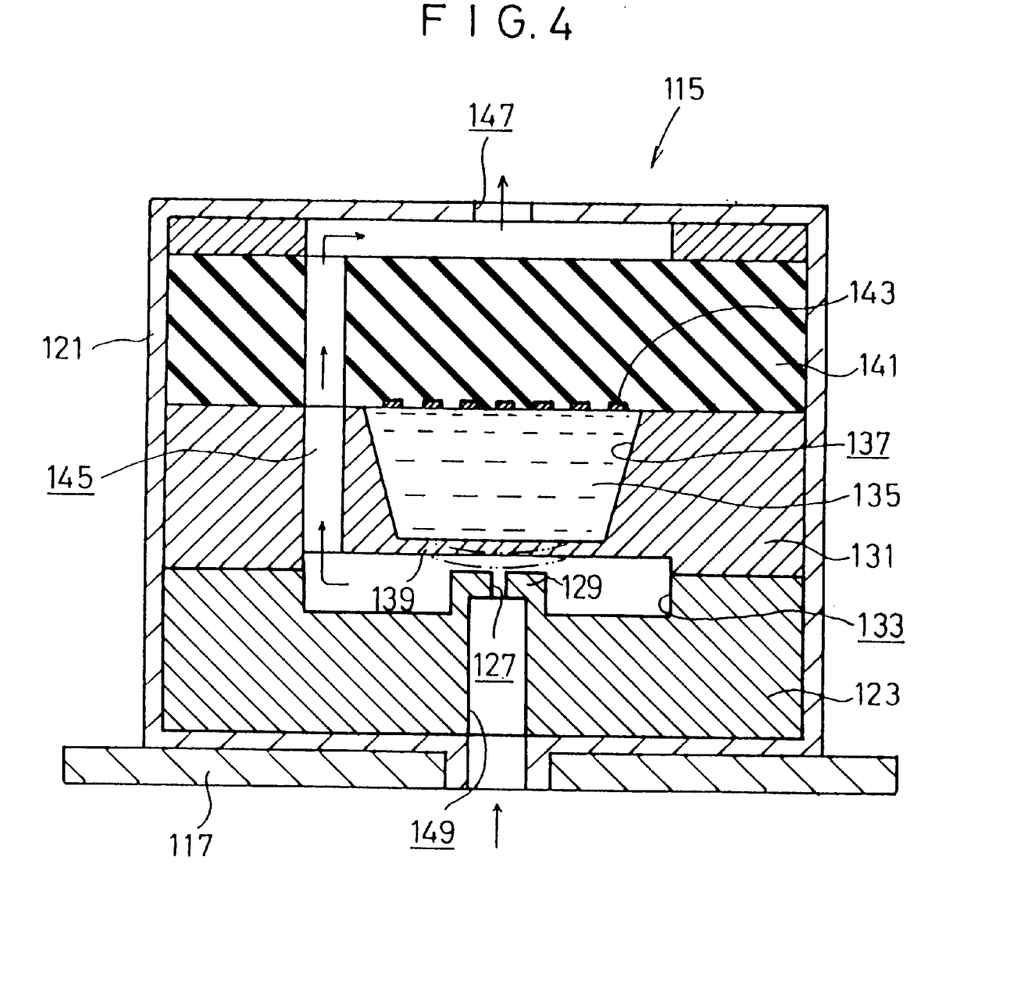
FIG. 4 is a vertical cross-sectional view of a flow amount control device constructed in the suck back valve shown in FIG. 1.

On the other hand, a third diaphragm chamber 88 blocked by a third diaphragm 86 is formed at a lower end of the stem 76 (see FIG. 4). The diaphragm 86 is connected to the stem 76 and is disposed for displacement integrally with the stem 76.

A ring-shaped cushioning member 90 for protecting a thin-walled portion of the third diaphragm 86 is disposed on an upper surface part of the third diaphragm 86, the cushioning member 90 being supported by a cross-sectionally L-shaped support member 92 connected to a lower end of the stem 76. Moreover, a displacement amount of the stem 76 in the direction of arrow $X_1$ is regulated by abutment of the support member 92 with an annular step 92 of the second valve body 72, whereas the displacement amount of the stem 76 in the direction of arrow $X_2$ is regulated by abutment of the flange of the stem 76 with a boss 96 of the second valve body 72.

A passage 98 for communicating the third diaphragm chamber 88 to atmosphere is formed in the second valve body 72, whereas a second pilot passage 100 for supplying a pilot pressure to the second diaphragm chamber 82 is formed in the cover member 52. The controller 32 includes a bonnet 102 which is assembled integrally with the first valve body 46 and a second valve body 72 which make up the valve driving device 30, wherein a pressurized fluid supply port 119a and a pressurized fluid discharge port 119b are formed in the bonnet.

Inside the bonnet 102 are arranged a first electromagnetic valve 104 functioning as a supply valve and controlling a pilot pressure which is supplied respectively to the cylinder chamber 48 of the ON/OFF valve 26 and to the second diaphragm chamber 82, a second electromagnetic valve 106 functioning as a discharge valve by discharging to the outside a pressurized fluid supplied to the first electromagnetic valve 104, and a pressure sensor 110 for detecting a pilot pressure supplied to the first electromagnetic valve 104 and outputting a detection signal thereof to the main control unit 108.

The first electromagnetic valve 104 and the second electromagnetic valve 106, respectively, are normally closed type valves, wherein by outputting respective current signals from the main control unit 108 to electromagnetic coils 112 of the first and second electromagnetic valves 104 and 106, unillustrated valve bodies therein are drawn in the direction of arrow $X_1$, putting the electromagnetic valves 104 and 106 respectively in an ON state.

Further, a flow amount control device 115 is disposed inside the bonnet 102, which controls a flow amount of pressurized fluid output from the first electromagnetic valve 104, and which supplies a pressurized fluid (pilot pressure) regulated at a predetermined pressure valve to the cylinder chamber 48 of the ON/OFF valve 26.

Figure 5:
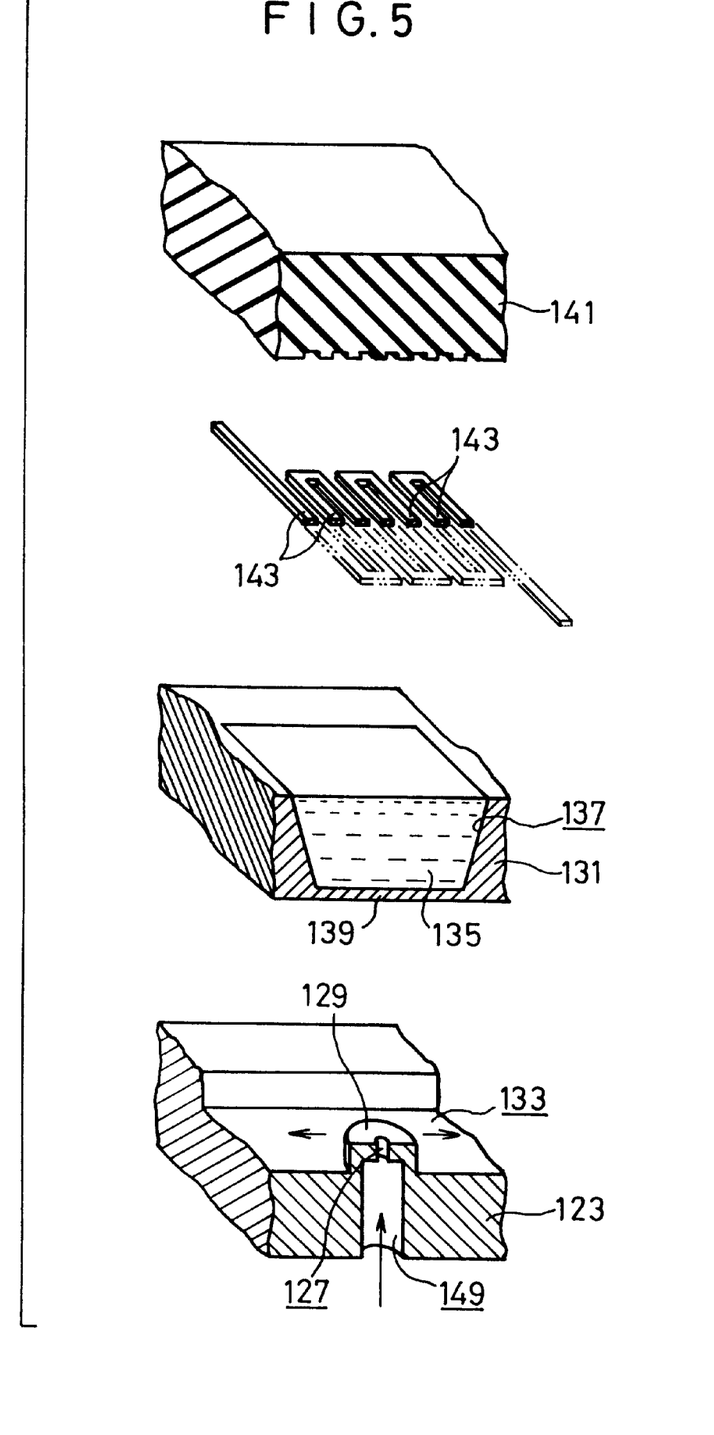
FIG. 5 is a disassembled cross-sectional view of the flow amount control device shown in FIG. 4.

The flow amount control device 115, as shown in FIGS. 4 and 5, is made up of a first wafer 123 formed of a single crystal silicon, or a similar glass element or the like, affixed to an interior of a casing 121 which is fixed to a substrate 117, and having an inlet port 149 formed on a lower part of the first wafer 123. The inlet port 149 is formed to communicate with the first electromagnetic valve 104 through a fourth passage 125 (to be discussed later on).

At an upper portion of the inlet port 149, a nozzle 129 formed by a small-diameter nozzle hole 127 is disposed. The nozzle hole 127 is formed in communication with an opening port in an upper surface of the first wafer 123, and to a first chamber 133 formed between the first wafer 123 and a second wafer 131.

The second wafer 131, like the first wafer, is formed by a single crystal silicon, or a similar glass material or the like, and is affixed to an upper surface of the first wafer 123. A second chamber 137 filled with a fluid 135 therein, for example a silicon liquid which expands by application of applied heat thereto, is formed in the interior of the second wafer 131. A bottom portion of the second chamber 137 forms a membrane 139, wherein the membrane 139 is separated a predetermined interval separation from an end of the nozzle 129, and is formed so as to flex toward the nozzle 129 by expansion of the fluid 135.

The second chamber 137 is hermetically sealed by affixing a glass wafer 141, formed by a heat-resistance glass, to an upper surface of the second wafer 131. On a lower part of the glass wafer 141 which makes up the upper surface of the second chamber 137, as shown in FIG. 5, a patterned electrical resistance 143 is disposed. The resistance 143 is electrically connected to the main control unit 108 through unillustrated electrodes and lead wires. A passage 145 which communicates with the first chamber 133 is formed inside the second wafer 131 and the glass wafer 141, the passage 145 being formed to communicate with an outlet port 147 formed in an upper portion of the casing 121. Moreover, the outlet 147 is formed to communicate with the ON/OFF valve 26 through the first pilot passage 64.

A pressure value or the like detected by the pressure sensor 110 is displayed on an LED display device 116 and, as needed, set pressure values which are set by an unillustrated key input device through a connector 118 may also be displayed on the LED display device 116.

Moreover, an unillustrated MPU (microprocessor unit) which functions as various means for performing control, evaluation, processing, calculation and memory storage, is disposed in the main control unit 108. By energizing and de-energizing the first electromagnetic valve 104 and the second electromagnetic valve 106 in accordance with control signals issued from the MPU, the pilot pressures (flow amounts) supplied respectively to the cylinder chamber 48 of the ON/OFF valve 26 and to the second diaphragm chamber 82 of the suck back mechanism 28 are controlled.

Further, a first passage 120 establishing communication between a pressurized fluid supply port 119a and the first electromagnetic valve 104, a second passage 122 establishing communication between the first electromagnetic valve 104 and the second electromagnetic valve 106, and a third passage 124 branching from the second passage 122 for introducing a pilot pressure to the pressure sensor 110, are formed inside the bonnet 102.

Further disposed inside the bonnet 102 are a fourth passage 125 branching from the second passage 122 and connected to an inlet port 149 of the flow amount control device 115, a first pilot passage 64 connected to an outlet port 147 of the flow amount control device 115 for supplying a pilot pressure to the cylinder chamber 48 of the ON/OFF valve 26, a second pilot passage 100 branching from the second passage 122 for supplying a pilot pressure to the second diaphragm chamber 82, and a fifth passage 126 intercommunicating the electromagnetic valve 106 and the pressurized fluid outlet port 26.

In this case, when an electrical current signal is supplied from the main control unit 108 to the electromagnetic coil 112 of the first electromagnetic valve 104, an unillustrated valve body therein displaces, putting the first electromagnetic valve 104 in an ON state, wherein the first passage 120, the second passage 122 and the fourth passage 125 are placed in mutual communication. Accordingly, the pressurized fluid (pilot pressure) supplied from the pressurized fluid supply port 119a is supplied to the flow amount control device 115 through the first passage 120, the second passage 122 and the fourth passage 125.

On the other hand, when an electrical signal is supplied from the main control unit 108 to the electromagnetic coil 112 of the second electromagnetic valve 106, an unillustrated valve body therein is displaced and the second electromagnetic valve 106 assumes an ON state, whereby the second passage 122 and the fifth passage 126 are placed in communication. Accordingly, pressurized fluid (pilot pressure) inside the second diaphragm chamber 82 is discharged to atmosphere passing through the fifth passage 126 and the pressurized fluid discharge port 119b.

The suck back valve 20 in accordance with the embodiment of the present invention is basically constructed as described above. Next, with reference to the circuit structure diagram shown in FIG. 3, an explanation shall be given of the operations and effects thereof.

Figure 3:
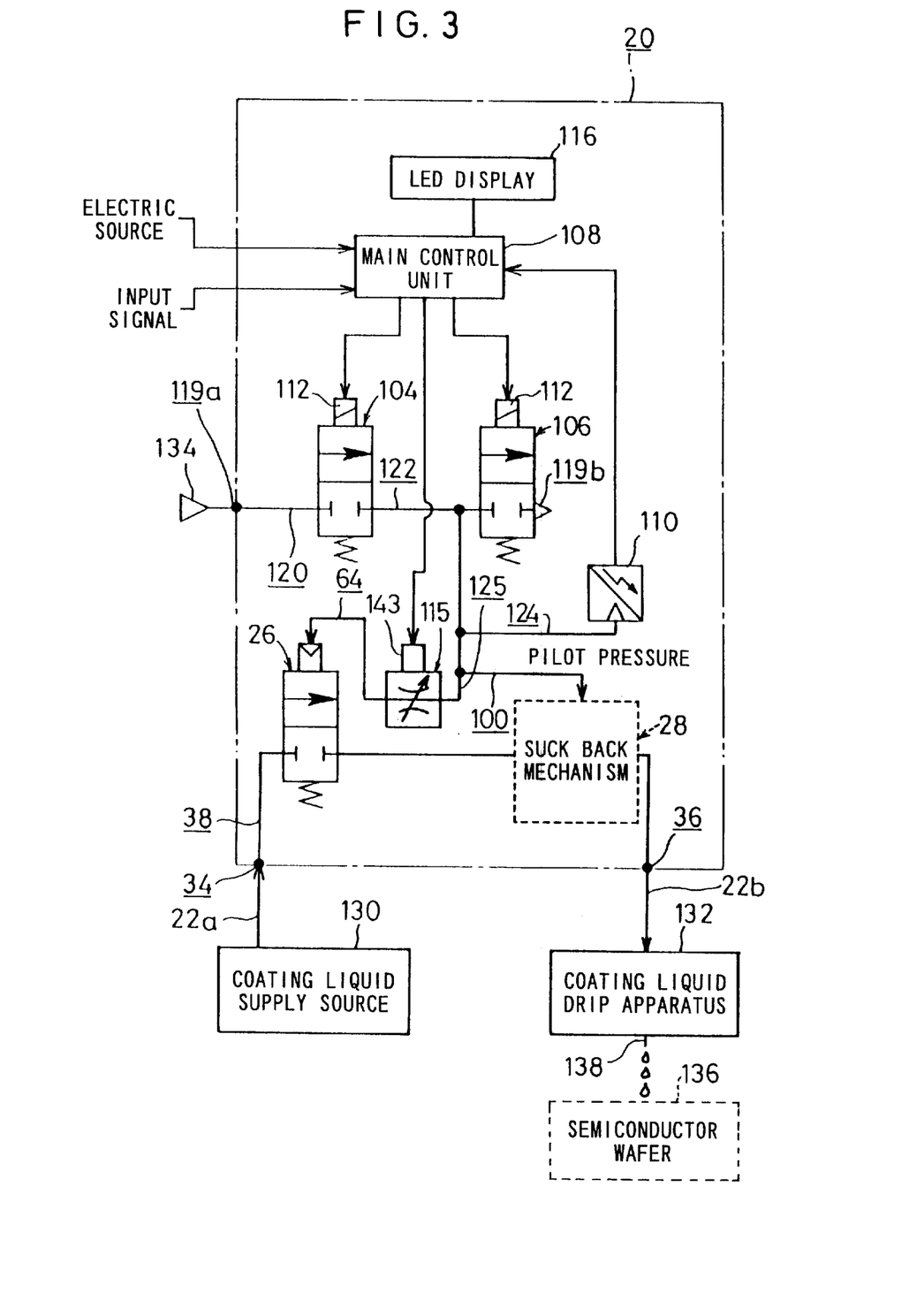
FIG. 3 is a view of a circuit structure of the suck back valve of FIG. 1.

First, a coating liquid supply source 130 storing therein a coating liquid is connected to tube 22a which communicates with the first port 34 of the suck back valve 20, whereas a coating liquid drip apparatus 132 having disposed thereon a nozzle 138 from which a coating liquid is dripped toward a semiconductor wafer 136 is connected to tube 22b which communicates with the second port 36. In addition, a pressurized fluid supply source 134 is connected to the pressurized fluid supply port 119a.

After completion of the above preparatory measures, the pressurized fluid supply source 134 is energized and a pressurized fluid is introduced to the pressurized fluid supply port 119a, and in addition an input signal is input to the main control unit 108 through an unillustrated input means. The main control unit 108 issues an energizing signal only to the first electromagnetic valve 104 based on the input signal, placing the first electromagnetic valve 104 in an ON state. At this time, the second electromagnetic valve 106 and the flow amount control device 115 respectively are de-energized and in an OFF state.

The pressurized fluid (pilot pressure) introduced from the pressurized fluid supply port 119a is supplied to the second diaphragm chamber 82 via mutually intercommunicating first passage 120, second passage 122, fourth passage 125 and the second pilot passage 100. Under action of the pilot pressure supplied to the second diaphragm chamber 82, the second diaphragm 80 is displaced, pressing the stem 76 in the direction of arrow $X_2$. As a result, the third diaphragm 86 which is connected to a lower end of the stem 76 is displaced, attaining the condition shown by FIG. 2.

Moreover, the pilot pressure supplied to the second diaphragm chamber 82 is introduced to the pressure sensor 110 through the third passage 24, and a detection signal output by the pressure sensor 110 is input to the main control unit 108, thus performing feedback control. Further, as for the pilot pressure supplied to the second diaphragm chamber 82, the flow amount of the pressurized fluid (pilot pressure) is controlled by respectively energizing and de-energizing the first electromagnetic valve 104 and the second electromagnetic valve 106 in accordance with control signals issued from an unillustrated MPU.

In this manner, in a state in which the second diaphragm 80 is pressed in the direction of arrow $X_2$ under action of the pilot pressure supplied to the second diaphragm chamber 82, the main controller 108 outputs an electrical signal to the flow amount control device 115. In the flow amount control device 115, an electric current is caused to flow through the electric resistance 143, whereby the membrane is pressed and flexes downward as shown by the two-dot-chain line in FIG. 4, and the separation interval between the membrane 139 and the nozzle 129 is set at a predetermined amount. Accordingly, the flow amount of pressurized fluid which is supplied to the interior of the first chamber 133 from the nozzle 127 is controlled by narrowing of the separation interval between the membrane 139 and the nozzle 129. As a result, by adjusting the flow amount of pressurized fluid discharged to the outlet port 147 through the passage 145 of the flow amount control device 115, the pilot pressure supplied to the cylinder chamber 48 of the ON/OFF valve 26 is controlled at a fixed value.

In this case, the pilot pressure supplied to the cylinder chamber 48 of the ON/OFF valve 26 may be controlled solely by the aforementioned flow amount control device 115 or may also be controlled by energization and de-energization of the first electromagnetic valve 104 and/or the second electromagnetic valve 106 by control signals output from an unillustrated MPU. Further, it is also possible to employ the flow amount control device 115 in concert with the first and/or second electromagnetic valve 104, 106 for controlling the pilot pressure supplied to the ON/OFF valve 26.

The pressurized fluid (pilot pressure) introduced to the cylinder chamber 48 displaces the piston 50 in the direction of arrow $X_1$ in opposition to the elastic force of spring elements 54a, 54b. Accordingly, the first diaphragm 56 connected to the piston 50 separates away from the seat 59, wherein the ON/OFF valve 26 assumes an ON state. At that time, the coating liquid supplied from the coating liquid supply source 130 flows along the fluid passage 38 and coating liquid is dripped onto the semiconductor wafer 136 through the nozzle 138 of the coating liquid drip apparatus 132. As a result, a coating layer (not shown) having a desired thickness is formed on the semiconductor wafer 136.

After a predetermined amount coating liquid has been applied to the semiconductor wafer 136 through the nozzle 138 of the coating liquid drip apparatus, the main control unit 108 issues an electrical signal to the flow amount control device 115, causing a reduction in the pilot pressure supplied to the cylinder chamber 48 of the ON/OFF valve 26, and placing the ON/OFF valve 26 in an OFF state.

More specifically, the current supplied to the electrical resistance 143 of the flow amount control device 115 is increased in accordance with a control output from the main control unit 110, and due to expansion of the fluid 135 filled inside the second chamber 137, the membrane 139 flexes toward the nozzle 139, narrowing the separation interval between the membrane 139 and the nozzle 129. As a result, the pressurized fluid which passes through the flow amount control device 115 is constricted by the narrowed separation interval between the membrane 139 and the nozzle 129, reducing the pilot pressure which is supplied to the cylinder chamber 48 of the ON/OFF valve 26. In addition, under action of an elastic force of spring elements 54a, 54b, the piston 50 displaces in the direction of arrow $X_2$, whereby the first diaphragm 56 is seated on the seat 59 and the ON/OFF valve 76 assumes an OFF state.

Moreover, the pilot pressure supplied to the cylinder chamber 48 of the ON/OFF valve 26 may also be lessened for putting the ON/OFF valve 26 in and OFF state by energizing and de-energizing the first electromagnetic valve 104 and the second electromagnetic valve 106, by control signals output from an unillustrated MPU in the main control unit 104.

By putting the ON/OFF valve 26 in an OFF state and interrupting the fluid passage 38, supply of coating liquid to the semiconductor wafer 136 is halted, and the dripping condition of coating liquid onto the semiconductor wafer 136 from the nozzle 138 of the coating liquid drip apparatus 132 is also suspended. In this case, because coating liquid immediately preceding that which has been dripped onto the semiconductor wafer 136 remains inside the nozzle of the coating liquid drip apparatus 132, there is a fear that unwanted liquid dripping may occur.

At that point, the main control unit 108 issues a de-energizing signal to the first electromagnetic valve 104 and the first electromagnetic valve 104 assumes an OFF state, simultaneously with issuing an energizing signal to the second electromagnetic valve 106, wherein the second electromagnetic valve 106 assumes and ON state.

Figure 6:
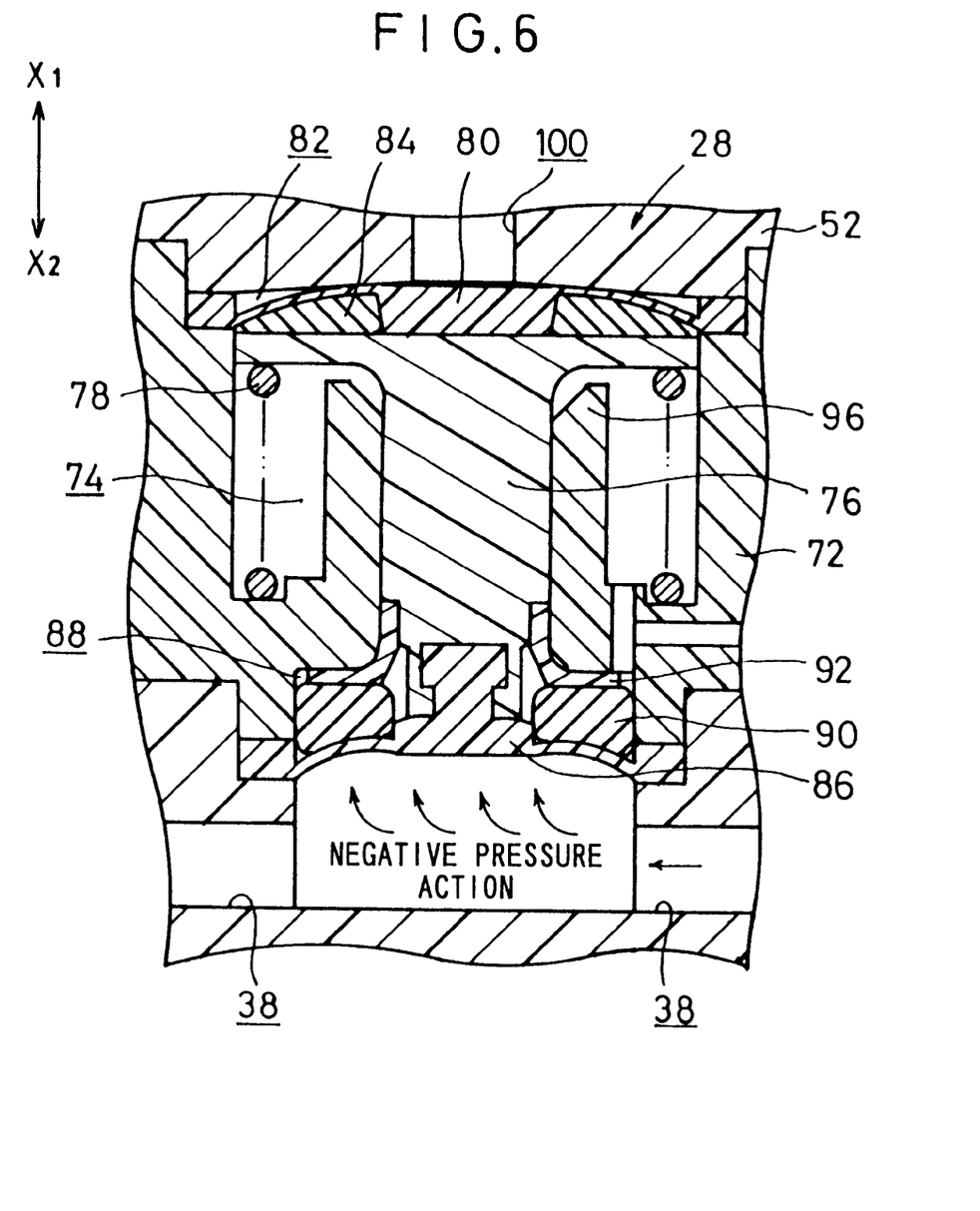
FIG. 6 is a partial vertical cross-sectional view showing operation of the suck back valve of FIG. 1.

Accordingly, by the first electromagnetic valve 104 assuming an OFF state and the second electromagnetic valve assuming an ON state, the fifth passage 126 and the second pilot passage 100 are put in communication, and the pressurized fluid (pilot pressure) maintained in the second diaphragm chamber 82 is discharged to atmosphere from the pressurized fluid discharge port 119b via mutually intercommunicating second pilot passage 100, second passage 122 and the fifth passage 126. At this time, the second diaphragm 80 is raised in the direction of arrow $X_i$ under action of the electromagnetic force of spring element 78, attaining the condition shown in FIG. 6.

More specifically, by raising of the second diaphragm 80, and displacement of the third diaphragm 86 integrally therewith in the direction of arrow $X_1$ via the stem 76, a negative pressure effect is generated. At this time, a predetermined amount of coating liquid inside the passage 38 is sucked along the direction of the arrows shown in FIG. 6. As a result, a fixed amount of coating liquid which remains inside the nozzle 138 of the coating liquid drip apparatus 132 is returned toward the side of the suck back valve 20, whereby unwanted dripping of liquid onto the semiconductor wafer 136 can be prevented.

Moreover, by again issuing an energizing signal to the flow amount control device 115 and putting the ON/OFF valve 26 in an ON state, simultaneously with issuing an energizing signal from the main control unit 108 to the first electromagnetic valve 104 which assumes an ON state, and issuing a de-energizing signal to the second electromagnetic valve 106 which assumes an OFF state, the condition shown in FIG. 2 is reached, and dripping of coating liquid onto the semiconductor wafer 136 is reinitiated.

As described above, in the present embodiment, by increasing the current signal supplied to the flow amount control device 115, and increasing the generated heat amount of the electrical resistance 143 therein, the membrane 139 can be made to flex toward the nozzle 139. Accordingly, by adjustment of the separation interval between the nozzle 129 and the membrane 139 under a flexure action of the membrane, the flow amount of pressurized fluid which flows through the nozzle hole 127 can be adjusted. In this case, by blocking the nozzle hole 127 with the membrane 139 under the flexure action thereof, it is also possible to interrupt the flow of the pressurized fluid.

Accordingly, together with highly accurate control of the pilot pressure supplied to the ON/OFF valve by the flow amount control device 115, response accuracy of the ON/OFF valve 26 can be even further improved.

More specifically, by controlling the pilot pressure supplied to the ON/OFF valve 26 by the flow amount control device 115, in comparison with the conventional technique, the driving speed of the ON/OFF valve 26 is improved, and further the driving range thereof can be widely expanded. Further, by improving the switching speed between ON and OFF states of the ON/OFF valve 26, it becomes possible to highly accurately set the flow amount of coating liquid that is dripped onto the semiconductor wafer 136. Further, because the membrane 139 facing the nozzle 129 is formed from a single crystal silicon, or similar glass like material, high frequency flexure actions can be sufficiently tolerated, clipping is reduced, and reproducibility of action is raised. As a result, structural fatigue on the membrane 139, which is the driven part, is minimized, durability is exceptional, and changes in performance thereof over time are hardly experienced. Moreover, because the fluid control means 115 can be manufactured using semiconductor manufacturing techniques, there is the advantage that such devices can be mass produced, yet with high accuracy.

Further, in the present embodiment, by integrally assembling respectively the coupling 24, ON/OFF valve 25, suck back mechanism 28 and the controller 32, in contradistinction to the aforementioned conventional technique, pipe connection operations between the suck back valve 20 and a fluid pressure control apparatus, or between the suck back valve 20 and the ON/OFF valve 26 become unnecessary, and because dedicated space for disposing the fluid pressure control device 18 and the ON/OFF valve 26 is not needed, installation space can be effectively utilized.

Further, in the present embodiment, because the ON/OFF valve 26 and the controller 32, etc., are formed integrally with suck back mechanism 28, as compared to respective separate structures which are assembled together as in the conventional technique, a reduction in scale of the apparatus can be achieved.

Furthermore, in the present embodiment, because there is no need for piping between the suck back valve 20 and the fluid pressure control device 18, an increase in fluid passage resistance can be avoided.

Further still, the pressurized fluids (pilot pressure) supplied respectively to the suck back mechanism 28 and the ON/OFF valve 26 are made common, and by control of the flow amount thereof through the flow amount control device 115, in contradistinction to the conventional technique, there is no need for a driving device 19 for driving the ON/OFF valve 26. As a result, along with further miniaturization of the overall apparatus structure, a reduction in cost is also attainable.

Moreover, in the present embodiment, although the pilot pressure supplied to the ON/OFF valve 26 is controlled through the flow amount control device 115 which is in turn electrically controlled by the main control unit 108, the invention is not necessarily so limited, and it is also possible to control the pilot pressure supplied to the suck back mechanism 28. In this case, response accuracy of the second diaphragm 80 operated by pilot pressure can be raised, and any coating liquid remaining in the fluid passage 38 can be even more swiftly sucked back.

What is claimed is:

1. A suck back valve comprising:

a coupling having a fluid passage with a first port formed in one end, and a second port formed in another end thereof;

a suck back mechanism for sucking a fluid inside said fluid passage under a negative pressure action of a flexible member displaced by a pilot pressure;

an ON/OFF valve for opening and closing said fluid passage under an action of said pilot pressure; and a controller having disposed therein a flow amount control device for electrically controlling the pilot pressure supplied to said suck back mechanism and to said ON/OFF valve;

wherein said flow amount control device comprises:
a container enclosing an expandable/contractible fluid, a part of said container being formed by a membrane;
a nozzle facing said membrane of the container; and
a heat-generating body for controlling applied heating of said fluid inside said container.

2. The suck back valve according to claim 1, said controller having disposed therein a supply valve and a discharge valve for adjusting the pilot pressure through supply and discharge actions thereof, wherein the pilot pressure supplied to the suck back mechanism and the ON/OFF valve is controlled respectively by said supply valve, said discharge valve and said flow amount control device.

3. The suck back valve according to claim 2, wherein said flow amount control device controls the pilot pressure supplied to the ON/OFF valve through a first pilot passage, and wherein said supply valve and said discharge valve control the pilot pressure supplied to the suck back mechanism through a second pilot passage.

4. The suck back valve according to claim 3, wherein the pilot pressures supplied to the ON/OFF valve and to the suck back mechanism are supplied from a common pressurized fluid supply source connected to the pressurized fluid supply port.

5. The suck back valve according to claim 1, wherein said container comprises a first wafer formed by a single crystal silicon, a second wafer stacked on said first wafer and formed by a single crystal silicon, and a glass wafer blocking a chamber filled with said fluid and formed from an insulating material.

6. The suck back valve according to claim 5, comprising an electrical resistance which functions as a heat-generating body, disposed on a bottom surface of the glass wafer facing said chamber.

7. The suck back valve according to claim 1, wherein said coupling, said suck back mechanism, said ON/OFF valve and said controller, respectively, are assembled integrally.

8. The suck back valve according to claim 1, wherein said suck back mechanism comprises:

a diaphragm displaced under action of the pilot pressure supplied from a pressurized fluid supply port;

a stem displaceably disposed inside a valve body and displaceable in unison with said diaphragm;

another diaphragm connected to an end of said stem and effecting a negative pressure action through displacement together with said stem; and a spring element biasing said stem in a predetermined direction.

9. The suck back valve according to claim 1, wherein said controller has disposed therein a main control unit for respectively electrically controlling said supply valve, said discharge valve and said flow amount control device.

* * * * *